United States Patent
Sharma

(10) Patent No.: US 10,897,274 B2
(45) Date of Patent: Jan. 19, 2021

(54) SHARED RADIO ARBITRATION

(71) Applicant: Microchip Technology Incorporated, Chandler, AZ (US)

(72) Inventor: Vishal Sharma, Irvine, CA (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 163 days.

(21) Appl. No.: 16/174,724

(22) Filed: Oct. 30, 2018

(65) Prior Publication Data

US 2019/0132013 A1 May 2, 2019

Related U.S. Application Data

(60) Provisional application No. 62/580,535, filed on Nov. 2, 2017.

(51) Int. Cl.
| | | |
|---|---|---|
| *H04B 1/00* | (2006.01) | |
| *H04W 88/18* | (2009.01) | |
| *H04W 88/12* | (2009.01) | |
| *H04W 72/10* | (2009.01) | |
| *G06F 13/40* | (2006.01) | |
| *G06F 13/362* | (2006.01) | |

(52) U.S. Cl.
CPC ......... *H04B 1/0057* (2013.01); *G06F 13/362* (2013.01); *G06F 13/4022* (2013.01); *H04W 72/10* (2013.01); *H04W 88/12* (2013.01); *H04W 88/182* (2013.01)

(58) Field of Classification Search
CPC . G06F 13/362; G06F 13/4022; H04B 1/0057; H04W 72/10; H04W 88/12; H04W 88/182; H04W 72/12; H04W 72/1215; H04W 72/1247; H04W 74/04; H04W 80/00; H04W 88/06

See application file for complete search history.

(56) References Cited

U.S. PATENT DOCUMENTS

| | | | | |
|---|---|---|---|---|
| 7,831,255 B1 * | 11/2010 | Gribble | ................ | H04B 17/354 |
| | | | | 370/329 |
| 8,086,213 B1 | 12/2011 | Wong et al. | ................ | 455/343.1 |
| 8,340,034 B1 * | 12/2012 | Lee | ...................... | H04B 1/3805 |
| | | | | 370/329 |
| 8,472,427 B1 * | 6/2013 | Wheeler | ........... | H04W 72/1215 |
| | | | | 370/348 |

(Continued)

OTHER PUBLICATIONS

International Search Report and Written Opinion, Application No. PCT/US2018/058328, 12 pages, dated Feb. 21, 2019.

*Primary Examiner* — Dung B Huynh

(74) *Attorney, Agent, or Firm* — Slayden Grubert Beard PLLC

(57) ABSTRACT

A radio arbiter circuit is disclosed comprising a digital connection to a radio circuit, which comprises a transmitter, a receiver, and a radio frequency antenna; a first connection to a first network link controller, which comprises a first baseband processor and a first interface to a processor bus; a second connection to a second network link controller, which comprises a second baseband processor and a second interface to a processor bus; a multiplexer for coupling either the first network link controller or the second network link controller to the radio circuit via the digital connection; and a control input to the multiplexer for selecting which network link controller has control of the radio circuit.

20 Claims, 4 Drawing Sheets

(56) References Cited

U.S. PATENT DOCUMENTS

| | | | | |
|---|---|---|---|---|
| 8,533,403 B1* | 9/2013 | Law | | G06F 13/1605 711/151 |
| 9,002,282 B1* | 4/2015 | de la Broise | | H04B 1/40 455/63.1 |
| 9,131,520 B1* | 9/2015 | Wheeler | | H04W 72/1215 |
| 9,454,723 B1* | 9/2016 | Cordes | | H04B 5/0062 |
| 2002/0172197 A1* | 11/2002 | Dale | | H04L 12/2801 370/386 |
| 2003/0125019 A1* | 7/2003 | Bajikar | | H04W 72/1215 455/420 |
| 2004/0029619 A1* | 2/2004 | Liang | | H04B 7/0604 455/562.1 |
| 2004/0127226 A1* | 7/2004 | Dugad | | H04W 72/10 455/450 |
| 2004/0177188 A1 | 9/2004 | Yoon | | 710/113 |
| 2004/0204205 A1* | 10/2004 | Goodjohn | | H04B 1/08 455/575.1 |
| 2006/0039330 A1* | 2/2006 | Hackett | | H04B 1/707 370/335 |
| 2006/0084383 A1* | 4/2006 | Ibrahim | | H04W 16/14 455/41.2 |
| 2006/0274704 A1* | 12/2006 | Desai | | H04W 72/1215 370/338 |
| 2007/0022238 A1* | 1/2007 | Metsker | | G06F 13/364 710/113 |
| 2007/0060055 A1* | 3/2007 | Desai | | H04W 84/12 455/41.2 |
| 2007/0153723 A1* | 7/2007 | Souissi | | H04W 88/16 370/328 |
| 2008/0253352 A1* | 10/2008 | Thoukydides | | H04W 72/1215 370/345 |
| 2009/0081962 A1* | 3/2009 | Sohrabi | | H04W 72/1242 455/79 |
| 2009/0137206 A1* | 5/2009 | Sherman | | H04W 16/14 455/41.2 |
| 2009/0164607 A1* | 6/2009 | Clark | | H04L 63/105 709/219 |
| 2010/0202416 A1* | 8/2010 | Wilhelmsson | | H04W 72/1215 370/336 |
| 2011/0194436 A1* | 8/2011 | Song | | H04W 76/27 370/252 |
| 2011/0205984 A1* | 8/2011 | Lee | | H04B 1/406 370/329 |
| 2011/0207490 A1* | 8/2011 | Lee | | H04W 88/06 455/509 |
| 2011/0287734 A1* | 11/2011 | Isobe | | H04W 4/90 455/404.1 |
| 2012/0309440 A1* | 12/2012 | Orjmark | | H04W 72/1215 455/509 |
| 2013/0121346 A1* | 5/2013 | Mitchell | | H04L 12/4625 370/465 |
| 2013/0310045 A1* | 11/2013 | Yan | | H04W 36/30 455/437 |
| 2014/0120969 A1* | 5/2014 | Sang | | H04B 1/406 455/501 |
| 2015/0181469 A1* | 6/2015 | Yu | | H04B 7/0691 370/311 |
| 2016/0174182 A1* | 6/2016 | Lin | | H04W 8/205 455/435.1 |
| 2017/0135125 A1* | 5/2017 | Buthler | | H04L 1/1887 |
| 2017/0208623 A1* | 7/2017 | Bate | | H04W 80/00 |

* cited by examiner

SHARED RADIO ARBITRATION

PRIORITY

The present application claims priority to U.S. Provisional Application 62/580,535, filed Nov. 2, 2017, the entire contents of which are hereby incorporated by reference.

TECHNICAL FIELD

The present disclosure relates to wireless communication and, more particularly, a wireless subsystem that supports a plurality of wireless interfaces sharing a single radio frequency (RF) radio.

BACKGROUND

Many applications of digital resources require or benefit from network communications with sensors, other digital resources, and user interfacing systems, for example. A digital resource may communicate over a wireless network via a network interface connected to a radio transceiver. A digital resource may be configured to communicate over two or more wireless networks. Such a configuration historically comprised a first network interface connected to a first radio transceiver and a second network interface connected to a second radio transceiver.

SUMMARY

Figure 1:
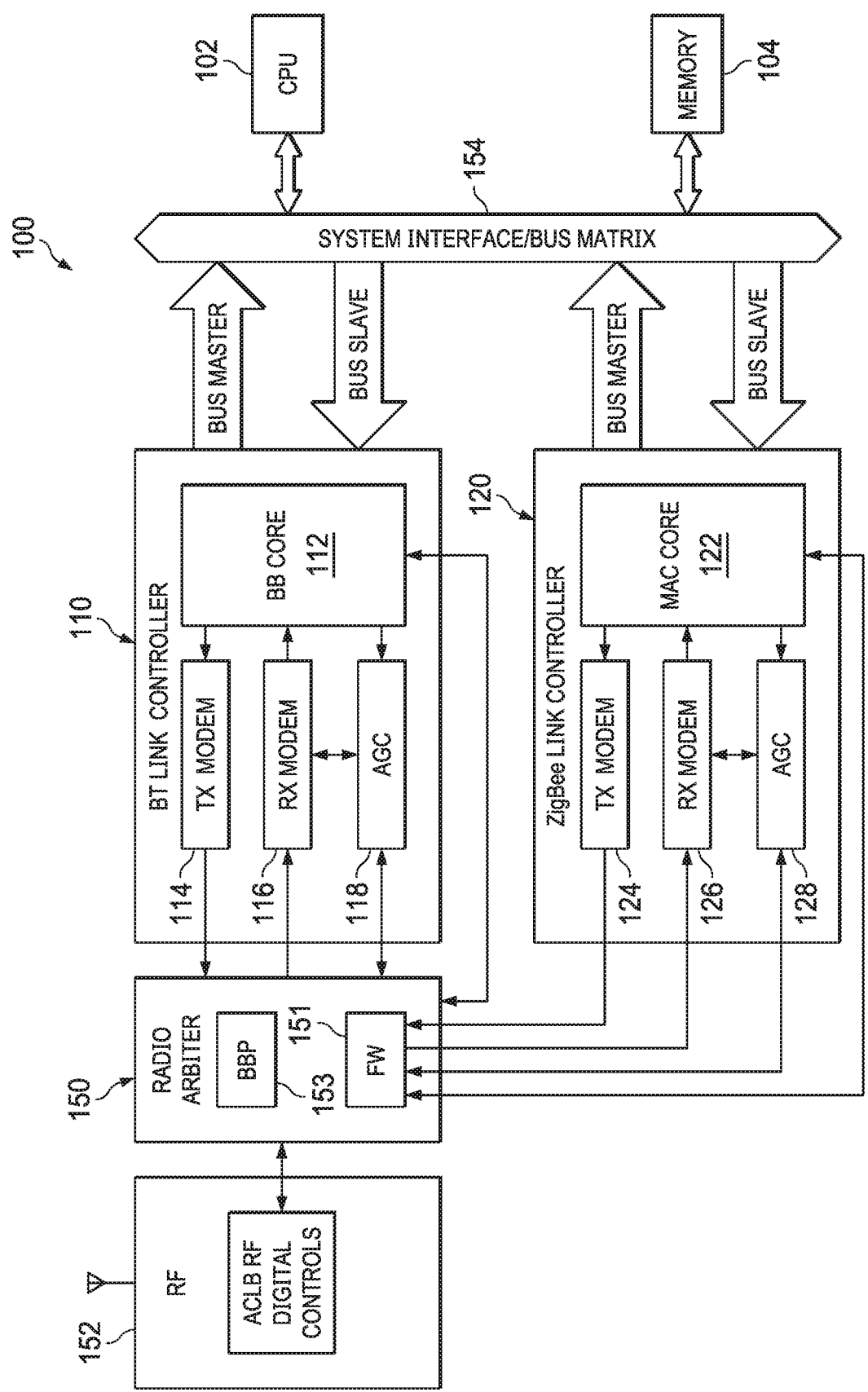
FIG. 1 illustrates an example configuration of two wireless interfaces sharing a single radio frequency radio.

According to certain embodiments, a radio arbiter circuit is disclosed comprising a digital connection to a radio circuit, which comprises a transmitter, a receiver, and a radio frequency antenna; a first connection to a first network link controller, which comprises a first baseband processor and a first interface to a processor bus; a second connection to a second network link controller, which comprises a second baseband processor and a second interface to a processor bus; a multiplexer for coupling either the first network link controller or the second network link controller to the radio circuit via the digital connection; and a control input to the multiplexer for selecting which network link controller has control of the radio circuit.

In combination with one or more of the disclosed embodiments, the radio arbiter circuit may be further configured to accept a first radio access request from the first network link controller, the request comprising a first priority value, accept a second radio access request from the second network link controller, the request comprising a second priority value, and determine the control input based at least in part on a comparison between the first priority value and the second priority value. In combination with one or more of the disclosed embodiments, the control input is set to select the first network link controller, an first radio request from the first network link controller is active and associated with a first priority value; and the radio arbiter circuit is configured to accept a second radio access request from the second network link controller comprising a second priority value; and based at least in part on a comparison between the first priority value and the second priority value: send a power down signal to the radio control circuit; and set the control input to select the second network link controller. In combination with one or more of the disclosed embodiments, the first radio request is further associated with a time-sensitive attribute, and the radio arbiter circuit is further configured to, based at least in part on a comparison between the first priority value and the second priority value, send an aborted request signal to the first network link controller. In combination with one or more of the disclosed embodiments, the first radio request is not associated with a time-sensitive attribute, and the radio arbiter circuit is further configured to: based at least in part on a comparison between the first priority value and the second priority value, send a delayed request signal to the first network link controller, and upon completion of the second radio access request, set the control input to select the first network link controller. In combination with one or more of the disclosed embodiments, the radio arbiter is configured to operate in: a static operating mode wherein the control input is set to a predetermined value, or a dynamic operating mode wherein the control input is determined upon receipt of a radio access request from either the first or the second network link controller.

In combination with one or more of the disclosed embodiments, the first radio request is not associated with a time-sensitive attribute, and the radio arbiter circuit is further configured to: based at least in part on a comparison between the first priority value and the second priority value, send a delayed request signal to the first network link controller, and upon completion of the second radio access request, set the control input to select the first network link controller. In combination with one or more of the disclosed embodiments, the radio arbiter circuit is configured to operate in: a static operating mode wherein the control input is set to a predetermined value, or a dynamic operating mode wherein the control input is determined upon receipt of a radio access request from either the first or the second network link controller. In combination with one or more of the disclosed embodiments, the radio arbiter circuit is configured to perform the following ordered steps: accept a first radio access request from the first network link controller to perform a first task, the request comprising a first priority value; determine the control input to grant control of the radio circuit by the first network link controller; accept a second radio access request from the second network link controller to perform a second task, the request comprising a second priority value greater than the first priority value; and prior to completion of the first radio access, determine the control input to grant control of the radio circuit by the second network link controller. In combination with one or more of the disclosed embodiments, the radio arbiter circuit is further configured to, after the second network link controller completes the second task, determine the control input to grant control of the radio circuit by the first network link controller to restart the first task. In combination with one or more of the disclosed embodiments, the radio arbiter circuit comprises a radio control output configured to power down at least a portion of the radio circuit before changing the control input to the multiplexer. In combination with one or more of the disclosed embodiments, the radio arbiter circuit is further configured to increment the first priority value. In combination with one or more of the disclosed embodiments, the radio arbiter circuit is further configured to determine a first access request type from the first radio access request; determine a priority adjustment value based at least in part on the first access request type; and adjust the first priority value based at least in part on the priority adjustment value.

According to certain embodiments, an integrated circuit is disclosed comprising a CPU, a memory, a first network link controller configured to communicate with a Zigbee network, a second network link controller configured to communicate with a Bluetooth network, a bus coupling the CPU to the memory, the first network link controller, and the second network link controller, and a radio arbiter circuit further comprising a digital connection to a radio circuit, which comprises a transmitter, a receiver, and a radio frequency antenna; a first connection to the first network link controller comprising a first baseband processor; a second connection to the second network link controller comprising a second baseband processor; a multiplexer for coupling either the first network link controller or the second network link controller to the radio circuit via the digital connection; and a control input to the multiplexer for selecting which network link controller has control of the radio circuit.

According to certain embodiments, a method is disclosed comprising accepting a first radio access request from a first network link controller, the request comprising a first priority value; accepting a second radio access request from a second network link controller, the request comprising a second priority value; and determining a control input based at least in part on a comparison between the first priority value and the second priority value, wherein the control input selects which network link controller controls a radio.

According to certain embodiments, a method is disclosed comprising identifying a first radio access event associated with a first network link controller, determining a first base priority value associated with the first radio access event, determining a first radio access event type associated with the first radio access event, determining, based at least in part on the first radio access event type, a first priority adjustment value, adjusting the first base priority value at least in part by the first priority adjustment value to determine a first priority value, identifying a second radio access event associated with a second network link controller, determining a second priority value associated with the second radio access event, and determining a control input based at least in part on a comparison between the first priority value and the second priority value, wherein the control input selects which network link controller controls a radio. In combination with one or more of the disclosed embodiments, the method further comprises, subsequent to determining the control input selected the second network link controller, adjusting the first priority value at least in part by the first priority adjustment value to determine a new first priority value, and determining the control input based at least in part on a comparison between the new first priority value and the second priority value, wherein the control input selects which network link controller controls a radio.

DETAILED DESCRIPTION

Certain embodiments of the present disclosure comprise two network interfaces sharing a single radio via a radio arbiter. The radio arbiter selects which network interface has control over (i.e., ownership of) the radio. In these embodiments, neither network interface utilizes 100% of available on-air radio time. The radio arbiter therefore intelligently switches ownership between the two. In some circumstances, the radio arbiter may base its switching decision at least in part on a prioritization of individual requests.

FIG. 1 illustrates an example configuration of two wireless interfaces sharing a single radio frequency radio. System 100 comprises network interfaces 110 and 120 interfaced with CPU 102 and memory 104 via system interface/bus matrix 154. System 100 further comprises radio arbiter 150 and radio module 152. In some embodiments, all components of system 100 may be incorporated into a single chip along with a processing unit, e.g., a microcontroller. In other embodiments, radio module 152 may be external. In still other embodiments, various components may be packaged separately or combined in part.

CPU 102 is a central processing unit, e.g., a microcontroller such as a PIC microcontroller offered by Microchip Technology incorporated. Memory 104 may store application data, control state data, and instructions for performing application functions and the networking processes described herein. Memory 104 may comprise, for example, firmware stacks for Bluetooth and Zigbee network communications. One or more firmware network stack may support mesh networking (e.g., both Bluetooth and Zigbee protocols support mesh networking).

Network interface 110 is a first network interface of system 100. Network interface 110 may be a Bluetooth™ link controller compatible with one or more Bluetooth™ network standards provided by Bluetooth SIG, Inc., or IEEE 802.15.1. Network interface 110 may be capable of link layer operations such as formatting and packaging data for transmission and interpreting received messages. Other link layer functions may include confirmation of transmission of a message, acknowledgment of receipt of a message, and discovery of reachable network nodes. Network interface 110 may be capable of physical layer operations of modulating encoded data for transmission via a radio transmitter and demodulating encoded data received from a radio receiver. In some embodiments, network interface 110 comprises all Bluetooth-implementing components needing certification for regulatory approval by an agency such as the United States Federal Communications Commission or its counterpart in other countries.

Network interface 110 may comprise base band core 112, transmitter modem 114, receiver modem 116, and automatic gain control (AGC) unit 118. Base band core 112 may be a real-time processing unit programmed to control at least physical and link layer protocol functions conforming to the Bluetooth protocol, Base band core 112 may be a processing unit capable of executing instructions for implementing the Bluetooth protocol. Base band core 112 may also be capable of initiating data transfers between network interface 110 and memory 104 external to network interface 110. Base band core 112 may include functionality to trigger an interrupt on central processing unit 102 external to network interface 110. An interrupt might notify the CPU of one or more messages (e.g., packets or reassembled messages) extracted from packets) received by the network interface. Base band core 112 may communicate with the external (to network interface 110) memory and the external (to network interface 110) processing unit may be via bus master and bus slave connections to system/interface bus matrix 154.

Transmitter modem 114 and receiver modem 116 may modulate and demodulate data, respectfully, in conformance with the Bluetooth specification. Modulation is the process of encoding digital data in an analog form for transmission over a physical medium. Automatic gain control (AGC) 118 provides a mechanism for adjusting the strength of the received signal to maximize the reliability of the demodulation process. For example, AGC 118 may boost a weak incoming signal (e.g., from a distant transmitter or one with a weak battery) and may attenuate a strong incoming signal (e.g., from a nearby transmitter) to provide a prescribed input level to receiver modem 116.

Network interface 120 is a second network interface of system 100. Network interface 120 may be a Zigbee link controller compatible with IEEE 802.15.4. Network interface 120 may be capable of link layer operations such as formatting and packaging data for transmission and interpreting received messages. Other link layer functions may include confirmation of transmission of a message, acknowledgment of receipt of a message, and discovery of reachable network nodes. Network interface 120 may be capable of physical layer operations of modulating encoded data for transmission via a radio transmitter and demodulating encoded data received from a radio receiver. In some embodiments, network interface 120 comprises all Zigbee-implementing components needing certification for regulatory approval by an agency such as the United States Federal Communications Commission or its counterpart in other countries.

Network interface 120 may comprise MAC core 122, transmitter modem 124, receiver modem 126, and automatic gain control (AGC) unit 128. MAC core 122 may be a real-time processing unit programmed to control at least physical and link layer protocol functions conforming to the Bluetooth protocol. MAC core 122 may be a processing unit capable of executing instructions for implementing the Bluetooth protocol. MAC core 122 may also be capable of initiating data transfers between network interface 120 and memory 104 external to network interface 120. MAC core 122 may include functionality to trigger an interrupt on central processing unit 102 external to network interface 120. An interrupt might notify the CPU of one or more messages (e.g., packets or reassembled messages extracted from packets) received by the network interface. MAC core 122 may communicate with the external (to network interface 120) memory and the external (to network interface 120) processing unit may be via bus master and bus slave connections to system/interface bus matrix 154.

Transmitter modem 124 and receiver modem 126 may modulate and demodulate data, respectfully, in conformance with the Bluetooth specification. Modulation is the process of encoding digital data in an analog form for transmission over a physical medium. Automatic gain control (AGC) 128 provides a mechanism for adjusting the strength of the received signal to maximize the reliability of the demodulation process. For example, AGC 128 may boost a weak incoming signal (e.g., from a distant transmitter or one with a weak battery) and may attenuate a strong incoming signal (e.g., from a nearby transmitter) to provide a prescribed input level to receiver modem 126.

MAC core 122 may be a real-time processing unit programmed to control at least physical and link layer protocol functions conforming to the Zigbee protocol. MAC core 122 may be a processing unit capable of executing instructions for implementing the Zigbee protocol. MAC core 122 may also be capable of initiating data transfers between network interface 120 and memory 104 external to network interface 120. MAC core 122 may include functionality to trigger an interrupt on central processing unit 102 external to network interface 120. An interrupt might notify the CPU of one or more messages (e.g., packets or reassembled messages extracted from packets) received by the network interface. MAC core 122 may communicate with the external (to network interface 120) memory and the external (to network interface 120) processing unit may be via a bus slave connection to system/interface bus matrix 154.

Radio arbiter 150 may be an electronic circuit for selectively allowing control of radio 152 by network interface 110 or network interface 120. Radio arbiter 150 may be implemented with decision making logic. In some embodiments, radio arbiter 150 may include programmable or configurable logic. In some embodiments, radio arbiter 150 may include a processor programmed to perform the arbitration function described herein. Radio arbiter 150 may receive an access request from either or both network interface 110 and network interface 120. Radio arbiter 150 determines which network interface should next control radio 152. Radio arbiter 150 may at a later time revoke control and grant control to the other network interface. Radio arbiter 150 thus allows two (or more) network interfaces to time share a single radio. In some embodiments, radio arbiter 150 may allow three or more network interfaces to time share two or more radios.

Radio 152 may be a selectively-powered radio module. Radio 152 may include analog domain circuitry to transform digital modulated data into high-frequency radio transmissions and in reverse to capture high-frequency radio transmissions and transform the transmissions into digital modulated data. Radio 152 may be, for example, a Microchip RF233 low power, 2.4 GHz transceiver. Radio 152 may comprise an analog control logic block (ACLB). ACLB may comprise a configuration/status register bank that may have an SPI connection to the network interface. ACLB may generate control signals to control the following radio components: receiver/transmitter circuitry, synthesizer/PLL, crystal oscillator, and low drop out (LIDO) controls for individual circuits. ACLB may also implement control logic for analog blocks in radio 152 such as VCO loop control.

Radio Arbitration

Radio arbiter 150 receives requests from network interface 110 and network interface 120. Radio arbiter may be configured to operate in a static mode, i.e., one network interface has exclusive control over radio 152. Radio arbiter may be configured to operate in a dynamic mode, i.e., a mode in which the radio arbiter grants to one network interface limited exclusive control over radio 152 and later grants a different network interface limited exclusive control over radio 152. In some embodiments, radio arbiter 150 may have a default network interface. The default interface, e.g., network interface 130 (Zigbee), may be granted control over radio 152 until another network interface requests control.

Radio arbiter 150 may connect to network interfaces 110 and 120 via a parallel system bus interface. Network interfaces 110 and 120 may generate transmit and receive activity event interrupts to be processed by firmware running on CPU 102.

In certain embodiments, each network transaction issued to a network interface by system interface 154 may result in a radio request to arbiter 152. In some embodiments, radio arbiter 152 may receive a single task request for a given time period. For example, a Bluetooth receive task may be queued by CPU 102 to perform a regular network "sniff," i.e., a periodic request to listen for Bluetooth messages. If radio arbiter 152 is in dynamic mode and no Zigbee task is queued, radio arbiter may grant control over radio 152 to network interface 110 until the task has completed. Radio arbiter 152 need not arbitrate access requests because only one request is pending.

In some embodiments, radio arbiter 152 may receive competing requests for access to radio 152 from each of network interfaces 110 and 120. If radio arbiter 152 is in dynamic mode, radio arbiter 152 must arbitrate the competing requests to determine which will be handled next. In some embodiments, arbiter 150 may drop the non-selected task and report the cancelled status to the requesting network interface. In some embodiments, arbiter 150 may hold the non-selected task in a queue and allow that task to proceed after the selected task completes.

In some embodiments, radio arbiter 150 may grant ownership of radio 152 to a network interface until ownership is granted to a different network interface. In other embodiments, radio arbiter 150 may maintain one network interface as a default owner of radio 152 and may return ownership to the default owner after another network interface has completed a task.

The following is a list of example arbitration events.

New request. A new radio request is received from a network interface originally initiated by firmware running on CPU 102.

Transaction completion. An active transaction, Zigbee or Bluetooth, completes. For Zigbee, a completion event may be a receive ACK reception after a transmit.

Cancel/abort. The current request is cancelled or aborted.

Timeout. The current radio owner times out and the other network interface has a pending request.

Each arbitration event may trigger an arbitration decision by arbiter 150. Arbiter 150 decides which of two (or more) competing requests from network interfaces will be processed. The arbitration decision may be based at least in part on certain attributes (discussed below). When arbiter 150 changes control over radio 152, radio 152 may be powered down and reset. The radio control switchover may interrupt an existing transmission or reception.

A radio request may be associated with request attributes. In some embodiments, a request may be associated with a base priority value attribute. The firmware stack for a network interface may assign a priority value to each transaction. In some embodiments, the priority value may be a 4-bit value ranging from 0 (lowest) to 15 (highest). This may be a sufficient range of values to implement a Bluetooth/Zigbee arbitration scheme. In other embodiments, the priority value may have fewer or more bits to allow for implementation of simpler or more complex arbitration schemes. Radio arbiter 150 may grant control to the transaction request with the highest priority value.

In certain embodiments, CPU 102 executing the Zigbee firmware stack may assign a priority value to a transmit request when the instructions enqueue the transmit packet in the ping-pong buffer. In certain embodiments, Zigbee firmware instructions may assign a priority value to a receive request when the request is issued to network interface 130.

In some embodiments, CPU 102 executing the Bluetooth firmware stack may assign a priority value to a transmit or receive request as request is enqueued in baseband core 112. The transfer request may be a single transmit and/or receive task or may be a Bluetooth "event" further comprising consecutive transmit/receive tasks. A Bluetooth "event" may be a set or series of network transactions that are related or interdependent.

In certain embodiments, a radio request may have an attribute for burst mode. When granting ownership to a burst mode request radio arbiter 150 may grant ownership for a period of time long enough to complete a series of transactions. A burst mode may avoid radio thrashing, as explained with respect to FIG. 5, below. Burst mode may be a mechanism for the network interface to communicate to radio arbiter 150 that multiple back-to-back transactions may be treated as an atomic operation without interruption of radio control. A timeout counter may be provided to prevent monopolization of the radio.

In some embodiments, a radio request may have an attribute for time sensitivity. This time-sensitivity attribute may be called an "immediate" attribute. The Bluetooth Low Energy (BLE) standard defines a connected state wherein a device is actively transmitting or receiving data. Many transactions in the connected state are time-sensitive. BLE devices communicate at a pre-defined frequency at pre-defined times. Often the information transferred is time-sensitive, meaning the information quickly becomes stale or worthless. For example, if a sound system is transmitting audio to BLE wireless headset, delayed packets cannot be used as audio has a natural flow and the delayed audio samples may sound jarring if played late or out of sequence. In another example, a real-time sensor system may report a sampled temperature value at some interval. While a delayed temperature reading may have value in an offline analytical setting, a real-time control system may operate incorrectly with delayed readings. These time-sensitive tasks should be cancelled if they cannot be executed immediately. The "immediate" attribute informs arbiter 150 of the time sensitive nature of a task.

Some transactions are not as time-sensitive. For example, BLE advertising and scanning tasks may be postponed while other tasks are completed. In another example, most Zigbee transactions are not time-sensitive and can be postponed and retried at a later time. These non-time-sensitive tasks and transactions may be indicated with the "immediate" attribute reset (0). In some embodiments, the arbitration algorithm is independent of the value of the "immediate" attribute. Thus, a low-priority task with a set "immediate" attribute may be cancelled in view of a competing higher-priority task even if the higher priority task is not time sensitive.

Some embodiments may support mesh networking with an always-on reception mode for radio 152. Radio arbiter 150 may be configured to enable this always-on reception mode for a single network interface. In some embodiments, arbiter 152 is configured to place the Zigbee network interface into an always-on reception mode for the purposes of mesh networking.

Figure 2:
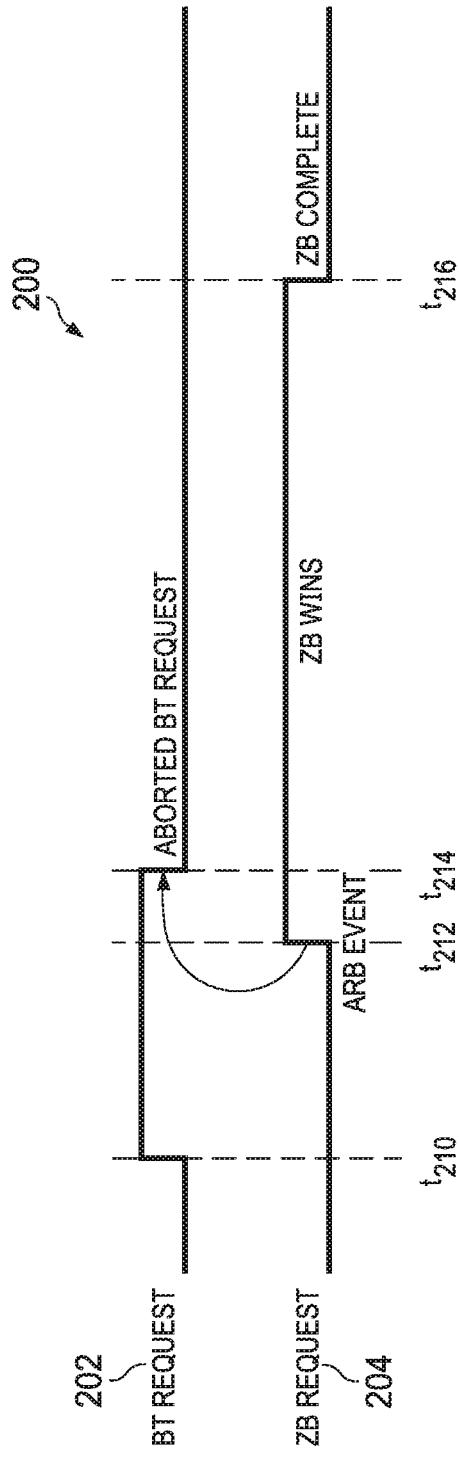
FIGS. 2-4 illustrate example timing diagrams illustrating arbitration of request by wireless interfaces for access to the single radio frequency radio.

FIG. 2 illustrates a timing sequence, according to certain embodiments. Timing diagram 200 comprises two requests for exclusive control over radio 152: Bluetooth request 202 and Zigbee request 204. Bluetooth request 202 arrives first, at $t_{210}$. Because no pending request had been made by the Zigbee network interface, arbiter 150 immediately grants access to radio 152. At time $t_{212}$ the Zigbee network interface requests access and triggers an arbitration event. Arbiter 150 determines the Zigbee request should be handled immediately and aborts the Bluetooth request at $t_{214}$. Once the Zigbee request completes, at $t_{216}$, arbiter does not restart the Bluetooth request because it was a time-sensitive request.

Figure 3:
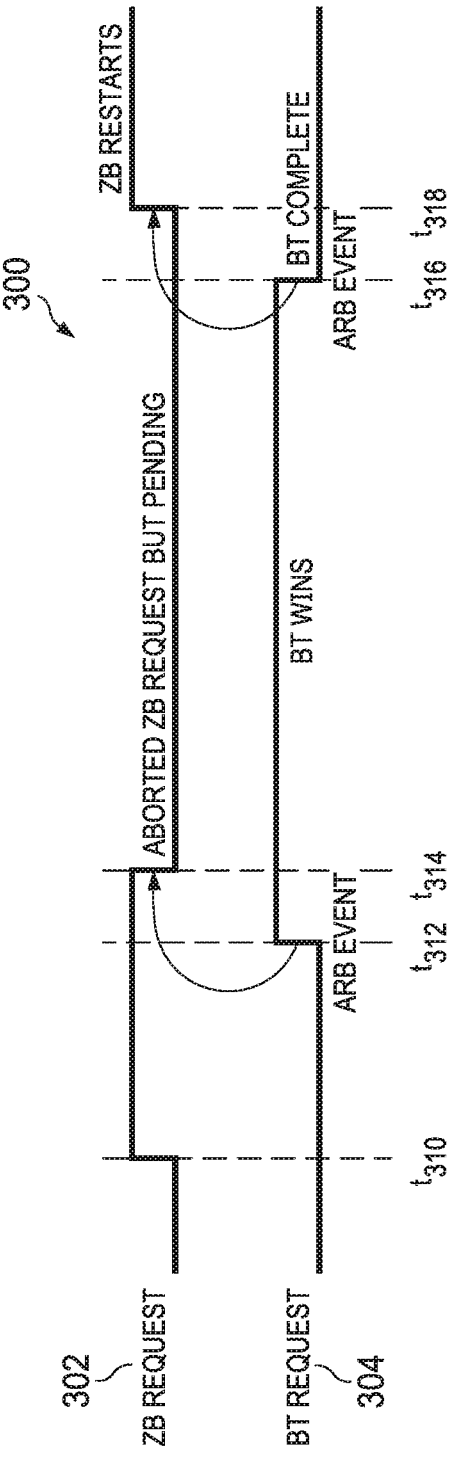

FIG. 3 illustrates a timing sequence, according to certain embodiments. Timing diagram 300 comprises two requests for control over radio 152: Zigbee request 302 and Bluetooth request 304. Zigbee request 302 arrives first, at $t_{310}$, with the attribute time-sensitive reset (zero). Because no pending request had been made by the Bluetooth network interface, arbiter 150 immediately grants access to radio 152. At time $t_{312}$ the Bluetooth network interface requests access and triggers an arbitration event. Arbiter 150 determines the Bluetooth request should be handled immediately and aborts the Zigbee request at $t_{314}$. Once the Bluetooth request completes at $t_{316}$, radio arbiter 150 restarts the previously-aborted Zigbee request at $t_{318}$.

In some embodiments, radio arbiter 150 may be programmed with multiple static modes of operation. Examples of static modes include: current radio owner continues to own the radio; Zigbee owns the radio; Bluetooth owns the radio. In certain embodiments, these static modes may be applied to resolve conflicts between requests with identical priority levels. Certain embodiments may employ a radio ownership timeout counter to force sharing of radio 152 when one of the static modes is activated.

For some transmission/reception events, multiple attempts may be made by a network interface. Firmware instructions may provide a retry count for the network interface. Some instructions to the network interface may implicitly require retry attempts. If a transmission/reception event is aborted by radio arbiter 150, the corresponding network interface may send subsequent retry events may to radio arbiter 150 with an increased priority value. In some embodiments, the increment value added to the base priority value may be programmable. In some embodiments, the priority may be incremented in a nonlinear manner.

As an example, a Bluetooth advertising event may require retries if preempted or aborted. In this example, each time an advertising event is missed because of a radio arbitration decision, the Bluetooth network interface may increase the priority of the advertising event by the programmable amount. After a successful advertisement event transmission, the priority may be reset to the base priority set by the firmware when initiating the advertisement task.

The base priority for a task may be assigned by the firmware stack when the task is initiated. A task associated with this base priority may comprise subtasks. For example, a transmission command may include one or more attempted transmissions, one or more back-off steps, actual transmission, and an ACK reception.

The base priorities of the individual requests are modified using programmed priority adjustments on the status of the sub-tasks for each of the request. The priority adjustment of the sub-tasks may increase the efficiency of the radio utilization between the two links significantly by avoiding the termination of tasks based on the sub-state. In some embodiments, radio arbiter 150 may adjust priorities of individual or remaining sub-tasks. In other embodiments, radio arbiter 150 may apply a single priority for the entire task.

In some embodiments, priority adjustment modes comprise incremental, decremental, and absolute. These modes may be configurable by firmware running on CPU 102. Under an incremental mode, adjustments are made by adding an adjustment value to a base priority. Under a decremental mode, adjustments are made by decrementing a base priority by an adjustment value. Under an absolute mode, the priority of a task (or sub-task) may be adjusted to equal the adjustment value. A priority adjustment may not trigger an arbitration event but may instead provide a basis for making a future arbitration decision during the pendency of a task (or sub-task).

Figure 4:
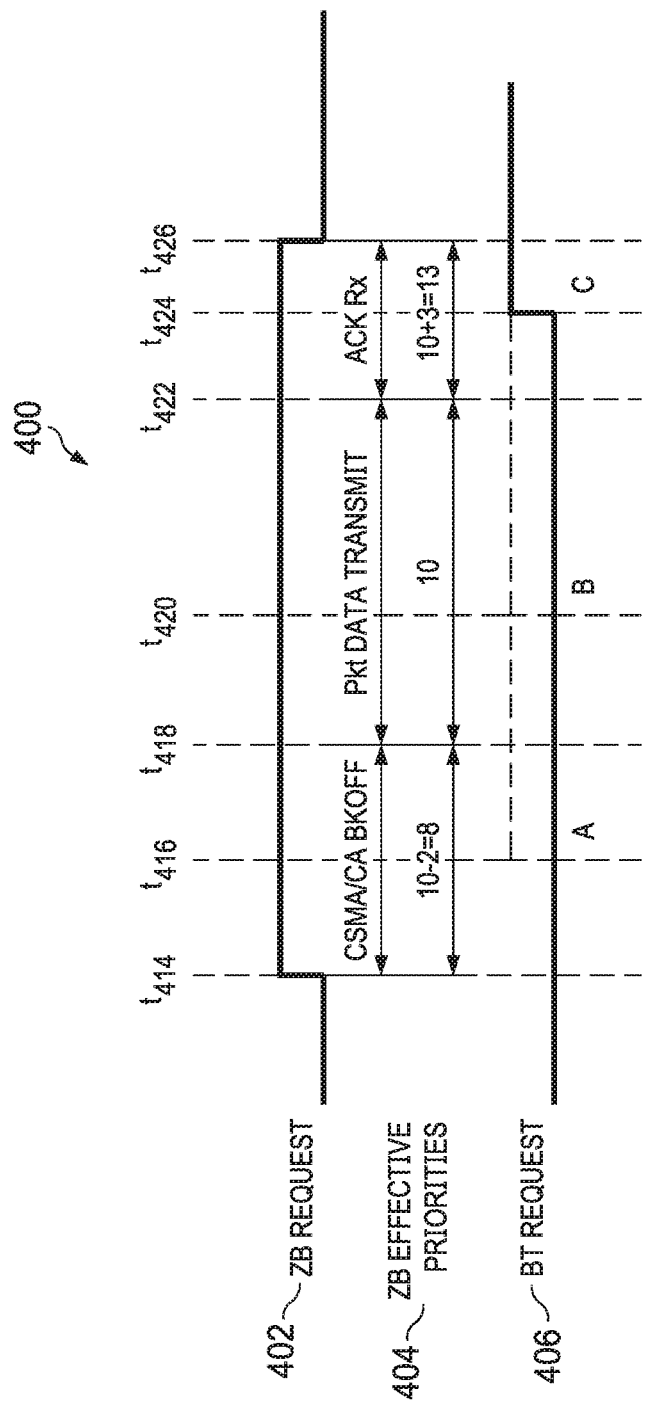

FIG. 4 illustrates a timing sequence, according to certain embodiments. Timing diagram 400 comprises two requests for exclusive control over radio 152: Zigbee transmission request 402 and Bluetooth request 406. Timing diagram 400 also comprises an annotation of effective priorities 404 of Zigbee request 402. Bluetooth request 406 arrives at $t_{416}$, $t_{420}$, or $t_{424}$ and is assigned a base priority of eleven (11). Zigbee transmission request 402 arrives at $t_{414}$ and is assigned a base priority of ten (10). Zigbee transmission request 402 may be a transmit/auto-retry evet. Zigbee request 402 comprises three sub-events: carrier sense multiple access with collision avoidance (CSMA/CA) back-off, packet data transmit, and acknowledgement (ACK) receipt. CSMA/CA spans $t_{414}$-$t_{418}$ and provides an opportunity for radio 152 to detect whether another radio is already transmitting on the same frequency before commencing transmission. Packet data transmission spans $t_{418}$-$t_{422}$, which may be significantly longer than the back-off window or the ACK window. Network interface 120 listens for an acknowledgement receipt between $t_{422}$-$t_{426}$ and may report whether the ACK was received. If the Zigbee transmission request 402 is interrupted before a complete ACK message has been received, the entire sequence of three sub-tasks must be restarted, including any portion of the relatively long transmission sub-task. Zigbee effective priorities may reflect the cost of aborting (and subsequently restarting) a pending Zigbee request.

Bluetooth request 406 is shown with three possible arrival times: $t_{416}$, $t_{420}$, and $t_{424}$, labeled A, B, and C, respectively. In the period spanning arrival time A, the Zigbee effective priority has been decremented from the base of ten (10) by a value of two (2) as the cost of aborting is relatively low. The CSMA/CA back-off sub-task may complete quickly, relative to the transmission sub-task. If the CSMA/CA back-off is taking significant time, this is due to competing traffic on the same frequency, which prevents effective transmission by radio 152 on the same frequency.

In the period spanning arrival time B, the Zigbee effective priority is equal to the base priority, which matches the stated priority of the transmission. In the period spanning arrival time C, the Zigbee effective priority has been incremented from the base of ten (10) by a value of three (3) as the cost of aborting is now relatively high as the entire sequence would need to be restarted including full transmission of the message. Further, the time required for this sub-task is relatively small in comparison with the transmission sub-task.

Similarly, when in Zigbee Receipt Automatic Acknowledgement (Rx_AACK) mode, the sub-task following receipt is the transmission of the ACK message, which should be issued a higher priority for the same reasons, as the Rx_AACK process is the counterpart of the transmission sequence shown in FIG. 4. This prioritization increases efficiency of the entire network.

If Bluetooth request 406 arrives with a priority of eleven (11), the arbitration result will be as follows. Arrival at time A or B results in an arbitration win for the Bluetooth request and the Zigbee request will be aborted and subsequently restarted. Arrival at time C results in an arbitration win for the Zigbee request and the Bluetooth request will be delayed or cancelled (if, for example, the Bluetooth request were marked time-sensitive).

In some embodiments, network interface 120 may fail to receive an ACK and may attempt retransmission. For each retransmission attempt, network interface 120 may increment the base priority of the event to reduce the probability of an arbitration loss to a competing Bluetooth request. This increment may be programmable.

TABLE 2, below, lists incremental priority groupings or buckets, according to certain embodiments of the present disclosure. In some embodiments firmware instructions may overwrite default priority values. A zero (0) programmed value results in an effective priority equal to the base (firmware assigned) priority. In some embodiments firmware instructions may overwrite the default priority relation. A person of ordinary skill in the art would understand, in view of this disclosure, how to adjust these events and values to alter the behavior of the system. A person of ordinary skill in the art would also understand, in view of this disclosure, how to develop an different table of event types, priority values, and priority relations.

TABLE 2

| ZB/BT | Tx/Rx | Applicable scenario (Link/Packet state) | Default Inc. Priority | Default priority relation with base priority | Effective Priority (with example base priority 5) |
|---|---|---|---|---|---|
| ZB | Rx | Rx-listen (no active packet being received) | 1 | Decremental | 4 |
| ZB | Rx | Rx active: header not received yet (or not directed packet yet) | 1 | Decremental | 4 |
| ZB | Rx | Rx active: passed address filtering | 1 | Incremental | 6 |
| ZB | Rx | Tx-ACK (with Rx AACK) (Would be high priority by default as the radio time transmitting is wasted if not acked) | 2 | Incremental | 7 |
| ZB | Tx | Tx scheduled-waiting for back-off | 2 | Decremental | 3 |
| ZB | Tx | Tx in transmit. Priority can increase with every retry attempt. | 1 | Incremental | 6 |
| ZB | Tx | RX: Waiting for ACK (with Tx ARET) (Would be high priority by default as the radio time transmitting is wasted if not Acked) | 2 | Incremental | 7 |
| BT | Adv | Repeating advertising event | 1 | Incremental | 6 |
| BT | Connection event | Incremental priority over a longer event. Priority inc will be applied after every programmable Tx/Rx transactions within a single connection event. | 1 | Decremental | 4 |

In certain embodiments a network interface request to arbiter 150 may include an "immediate" attribute. A request marked "immediate" may be aborted immediately. The network interface may then return to an idle state and an immediate abort interrupt may be raised. Firmware executing on CPU 102 may treat an immediately-aborted request as on-air corruption. "Non-immediate" requests may be postponed at the hardware level. The network interface may be stalled for radio availability. A "non_immediate_abort" interrupt may be raised for loss during active Tx/Rx. Firmware executing on CPU 102 may optionally ignore this interrupt as the network interface will retry the request. The network interface may retry when higher-priority transaction completes.

BLE is an event-oriented protocol (e.g., advertising event, connection event). A task initiated by the Bluetooth firmware stack as a single Tx or Rx task may generate a series of sub-tasks. An advertisement packet transmission task may be followed by a scan request task and then transmission of a scan response packet. Each sub-task may be separated by approximately 150 μs (T_IFS), the whole event (advertising or connection) may be treated as a single task for arbitration purpose. Thus, all sub-tasks within a BLE event may be treated as a single "burst-req." An incremental priority bucket may be set for BLE connection events which can be exercised to abort a long-extending BT event. In some embodiments, a timeout may abort long Bluetooth events. The timeout determines the maximum time the radio can be continuously owned by one link controller while a request is pending from a competing network interface. This timeout may be programmable. Upon expiration of the timeout, arbiter 152 will abort the active event and raise an interrupt. The timeout may generate a new arbitration event, thus providing an immediate opportunity for the competing network interface. In certain embodiments, the timeout may be disabled by configuring for a zero (0) timeout value.

Some Zigbee scheduled events may be delayed. Radio arbiter 150 may emulate the delay as a combination of "back-off delay" and "retry" in the transaction finite state machine (FSM) based on the sub-state where the transmission was interrupted. This delay may be transparent to CPU 102. In some embodiments, arbiter 150 may generate an interrupt indicating delay in transmission to signal the delay to CPU 102. A similar process may be employed for a scheduled reception event.

In some embodiments, priority adjustment may be performed by a network interface informed by its internal state. In some of these embodiments, MAC core 122 may determine ZB Effective Priorities 404 and provide arbiter 150 with the resultant effective value. In other embodiments, MAC Core 122 may determine a priority adjustment value and provide arbiter 150 with a base priority value along with a priority adjustment value. In other embodiments, the network interface may provide radio arbiter 150 with sufficient information to calculate effective priorities. In some embodiments, a network interface may communicate a radio access request to arbiter 150 along with an access type identifier. In certain embodiments, access type may be inferred or determined from the sequence or contents of one or more radio access requests. Radio arbiter 150 may use this access type information or determination to increment or decrement a base priority value according to the method of this disclosure.

CPU 102 may execute firmware instructions to read the status of arbiter 150. The status may be stored in a register and may report that the radio is controlled by a specific network interface or is in a state of transition. If the radio is transitioning, CPU 102 may delay issuing a new request. Arbiter 150 may also report the priority of an active request. Arbiter 150 may report the base priority and the decremental or incremental priority. A network interface may read this status information to determine the priority for its next radio request.

Figure 5:
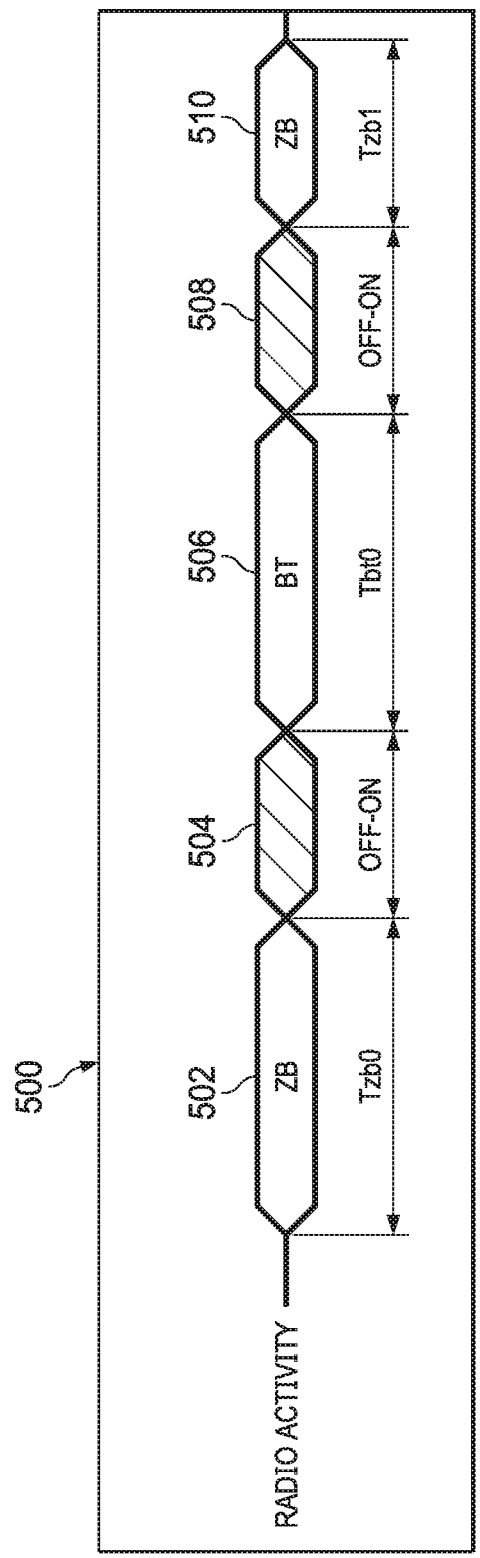
FIG. 5 illustrates radio control transitions, according to embodiments of the present disclosure.

FIG. 5 illustrates radio control transitions, according to embodiments of the present disclosure. Sequence 500 comprises the following events: Zigbee task 502, which lasts Tzb0; radio transition 504; Bluetooth task 506, which lasts Tbt0; radio transition 508; and Zigbee task 510, which lasts Tzb1.

Radio arbiter 150 may perform the radio control transition transparent to the CPU. When the radio ownership transitions, the radio may sequence through states as follows: ON (current)→OFF→ON (new). When in OFF state, the phased-locked loop (PLL) may be turned off but the oscillator (Xtal) may remain on. When losing the radio ownership, the network interface currently owning the radio cycles through an abort sequence, which may include turning off the radio. Proper ramp-down of the radio may avoid spurious transmission, which might cause spectral mask violations. The abort sequence and radio transition may be performed in 20 µs, or faster.

When gaining the radio ownership, the network interface (new owner) may sequence through the process of turning on the radio. This sequence may include programming the new required radio channel number. If the PLL, is off the network interface may turn on the PLL before turning Tx/Rx controls on. A total RF settling time may complete within 80 µs. Thus, the total radio turn-around time may complete within 100 µs.

The actual radio setup may be controlled by individual modem/physical layer controllers within network interface 110 or 120. The setup may include setup of transmission circuitry, power amplifier (PA), automatic gain control (AGC), receive circuitry, etc. Arbiter 150 may initiates these on-off-on sequences by aborting an active network task and transitioning control to a different network interface with a pending request.

Considering FIG. 5 in more detail, radio utilization efficiency between two links may be represented as:

$$RF\ \text{utilization efficiency} = \frac{\sum TZB + \sum TBT}{\sum TZB + \sum TBT + \sum Tturnabound}$$

TBT captures the radio control time for the Bluetooth link and TZB captures the radio control time for the Zigbee link. Turnaround captures the radio turnaround time needed to switch ownership between network interfaces. Smaller transactions between transitions will result in reduced radio utilization efficiency. Likewise, aborted transactions followed by transitions will further reduce utilization. Time spent on aborted transactions may be subtracted from the numerator when calculating radio utilization efficiency.

Low radio utilization efficiency may result from unusually small packet sizes (transmission and/or reception). Low radio utilization efficiency may also result from priority bumping of a task that most recently lost arbitration followed by an immediate retry. A network interface controller may be programmed to increase radio utilization efficiency. In some embodiments, each network interface may separate subsequent transactions to provide meaningful radio time for use by another network interface. For example, consider the specification of a Bluetooth 5.0 advertising event. The time spacing of a secondary channel advertisement packet from the corresponding primary channel advertisement packet is identified as T_MAFS. The Bluetooth 5.0 specification sets a minimum of 300 µs but allows a larger value. Between the primary and secondary ADV packet transmission, the radio can be used by the Zigbee network interface. However, a 300 µs separation may not provide a usable window to transition the radio twice and execute a Zigbee task. In some embodiments, T_MAFS may be set to a value significantly greater than 300 µs. In some embodiments, T_MAFS may be set to 600 µs. In other embodiments, T_MAFS may be set to 900 µs.

Figure 6:
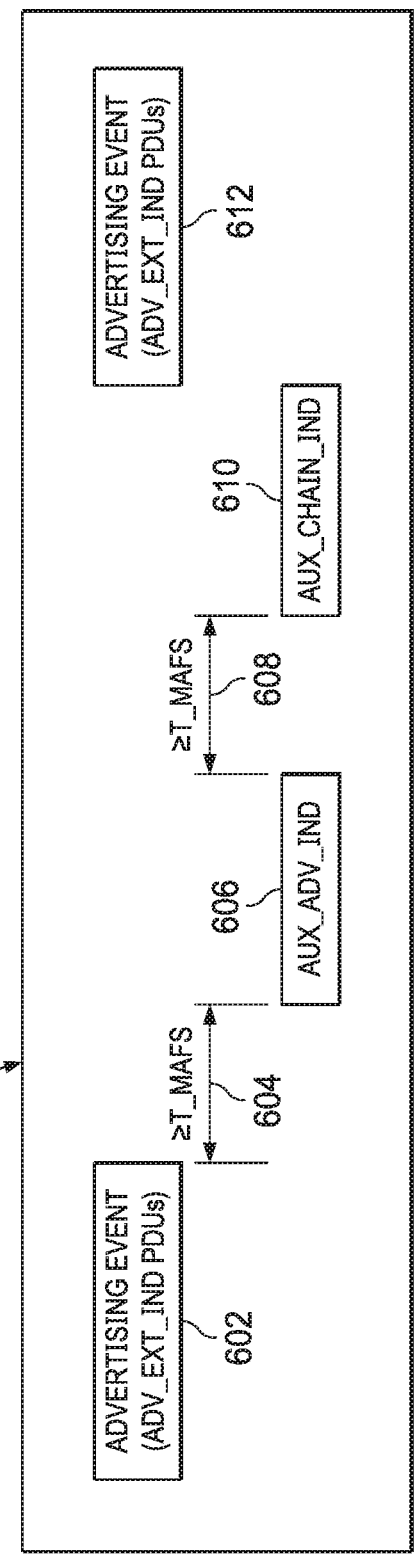
FIG. 6 illustrates a sequence of network events, according to Bluetooth documentation.

FIG. 6 illustrates a sequence of network events, described in Bluetooth documentation. Sequence 600 comprises the following events: Bluetooth advertising events 602, 606, 610, and 612. Sequence 600 also comprises Bluetooth transmission gaps 604 and 608. Bluetooth advertising events 602 and 612 are performed on the primary advertising channel. Bluetooth advertising events 606 and 610 are performed on the secondary advertising channel. Event 610 is a chain event, which was created to carry additional data beyond what could fit in event 606. Per the Bluetooth specification, the Bluetooth network interface must wait at least T_MAFS between advertising events 602 and 606.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

I claim:

1. A radio arbiter circuit comprising:
   a digital connection to a radio circuit, which comprises a transmitter, a receiver, and a radio frequency antenna;
   a first connection to a first network link controller, which comprises a first baseband processor and a first interface to a processor bus;
   a second connection to a second network link controller, which comprises a second baseband processor and a second interface to a processor bus;
   a multiplexer for coupling either the first network link controller or the second network link controller to the radio circuit via the digital connection; and
   a control input to the multiplexer for selecting which network link controller has control of the radio circuit, wherein
   the control input is set to select the first network link controller;
   a first radio request from the first network link controller is active and associated with a first priority value; and
   the radio arbiter circuit is configured to:
     accept a second radio access request from the second network link controller comprising a second priority value; and
     based at least in part on a comparison between the first priority value and the second priority value:
       send a power down signal to the radio circuit; and
       set the control input to select the second network link controller;
   wherein the first radio request is further associated with a time-sensitive attribute, and
   the radio arbiter circuit is further configured to, based at least in at least in part on a comparison between the first priority value and the second priority value, send an aborted request signal to the first network link controller.

2. The radio arbiter circuit of claim 1, further configured to operate in:
   a static operating mode wherein the control input is set to a predetermined value, or
   a dynamic operating mode wherein the control input is determined upon receipt of a radio access request from either the first or the second network link controller.

3. The radio arbiter circuit of claim 1 wherein the radio arbiter circuit is configured to perform the following ordered steps:
   accept the first radio access request from the first network link controller to perform a first task, the request comprising the first priority value;
   determine the control input to grant control of the radio circuit by the first network link controller;

accept the second radio access request from the second network link controller to perform a second task, the request comprising the second priority value greater than the first priority value; and prior to completion of the first radio access, determine the control input to grant control of the radio circuit by the second network link controller.

4. The radio arbiter circuit of claim 3 wherein the radio arbiter circuit is further configured to:
   increment the first priority value.

5. The radio arbiter circuit of claim 1 further configured to:
   determine a first access request type from the first radio access request;
   determine a priority adjustment value based at least in part on the first access request type; and
   adjust the first priority value based at least in part on the priority adjustment value.

6. A radio arbiter circuit comprising:
   a digital connection to a radio circuit, which comprises a transmitter, a receiver, and a radio frequency antenna;
   a first connection to a first network link controller, which comprises a first baseband processor and a first interface to a processor bus;
   a second connection to a second network link controller, which comprises a second baseband processor and a second interface to a processor bus;
   a multiplexer for coupling either the first network link controller or the second network link controller to the radio circuit via the digital connection; and
   a control input to the multiplexer for selecting which network link controller has control of the radio circuit, wherein
   the control input is set to select the first network link controller;
   a first radio request from the first network link controller is active and associated with a first priority value; and
   the radio arbiter circuit is configured to:
      accept a second radio access request from the second network link controller comprising a second priority value, and
      based at least in part on a comparison between the first priority value and the second priority value:
         send a power down signal to the radio circuit; and
         set the control input to select the second network link controller;
   Wherein the first radio request is not associated with a time-sensitive attribute, and the radio arbiter circuit is further configured to:
      based at least in part on a comparison between the first priority value and the second priority value, send a delayed request signal to the first network link controller, and
      upon completion of the second radio access request, set the control input to select the first network link controller.

7. The radio arbiter circuit of claim 6, further configured to operate in:
   a static operating mode wherein the control input is set to a predetermined value, or
   a dynamic operating mode wherein the control input is determined upon receipt of a radio access request from either the first or the second network link controller.

8. The radio arbiter circuit of claim 6 wherein the radio arbiter circuit is configured to perform the following ordered steps:
   accept the first radio access request from the first network link controller to perform a first task, the request comprising the first priority value;
   determine the control input to grant control of the radio circuit by the first network link controller,
   accept the second radio access request from the second network link controller to perform a second task, the request comprising the second priority value greater than the first priority value, and
   prior to completion of the first radio access, determine the control input to grant control of the radio circuit by the second network link controller.

9. The radio arbiter circuit of claim 8 wherein the radio arbiter circuit is further configured to:
   increment the first priority value.

10. The radio arbiter circuit of claim 6 further configured to:
    determine a first access request type from the first radio access request;
    determine a priority adjustment value based at least in part on the first access request type; and
    adjust the first priority value based at least in part on the priority adjustment value.

11. An integrated circuit comprising:
    a CPU,
    a memory,
    a first network link controller configured to communicate with a Zigbee network,
    a second network link controller configured to communicate with a Bluetooth network,
    a bus coupling the CPU to the memory, the first network link controller, and the second network link controller, and
    a radio arbiter circuit comprising:
       a digital connection to a radio circuit, which comprises a transmitter, a receiver, and a radio frequency antenna;
       a first connection to the first network link controller comprising a first baseband processor;
       a second connection to the second network link controller comprising a second baseband processor;
       a multiplexer for coupling either the first network link controller or the second network link controller to the radio circuit via the digital connection; and
       a control input to the multiplexer for selecting which network link controller has control of the radio circuit,
    wherein
    the control input is set to select the first network link controller;
    a first radio request from the first network link controller is active and associated with a first priority value; and
    the radio arbiter circuit is configured to;
       accept a second radio access request from the second network link controller comprising a second priority value; and
       based at least in part on a comparison between the first priority value and the second priority value:
          send a power down signal to the radio circuit; and
          set the control input to select the second network link controller, wherein the first radio request is further associated with a time-sensitive attribute, and
    the radio arbiter circuit is further configured to, based at least in part on a comparison between the first priority value and the second priority value, send an aborted request signal to the first network link controller.

12. The integrated circuit of claim 11 wherein the radio arbiter circuit is further configured to operate in:
 a static operating mode wherein the control input is set to a predetermined value, or
 a dynamic operating mode wherein the control input is determined upon receipt of a radio access request from either the first or the second network link controller.

13. The integrated circuit of claim 11 wherein the radio arbiter circuit is further configured to perform the following ordered steps:
 accept the first radio access request from the first network link controller to perform a first task, the request comprising the first priority value;
 determine the control input to grant control of the radio circuit by the first network link controller;
 accept the second radio access request from the second network link controller to perform a second task, the request comprising the second priority value greater than the first priority value; and
 determine the control input to grant control of the radio circuit by the second network link controller.

14. The integrated circuit of claim 13 wherein the radio arbiter circuit is further configured to:
 Increment the first priority value.

15. The integrated circuit of claim 11 further configured to:
 determine a first access request type from the first radio access request;
 determine a priority adjustment value based at least in part on the first access request type; and
 adjust the first priority value based at least in part on the priority adjustment value.

16. An integrated circuit comprising:
 a CPU,
 a memory,
 a first network link controller configured to communicate with a Zigbee network,
 a second network link controller configured to communicate with a Bluetooth network,
 a bus coupling the CPU to the memory, the first network link controller, and the second network link controller, and
 a radio arbiter circuit comprising:
  a digital connection to a radio circuit, which comprises a transmitter, a receiver, and a radio frequency antenna;
  a first connection to the first network link controller comprising baseband processor;
  a second connection to the second network link controller comprising a second baseband processor;
  a multiplexer for coupling either the first network link controller or the second network link controller to the radio circuit via the digital connection; and
  a control input to the multiplexer for selecting which network link controller has control of the radio circuit,
 wherein
  the control input is set to select the first network link controller,
  a first radio request from the first network link controller is active and associated with a first priority value; and
  the radio arbiter circuit is configured to:
   accept a second radio access request from the second network link controller comprising a second priority value; and
   based at least in part on a comparison between the first priority value and the second priority value:
    send a power down signal to the radio circuit; and
    set the control input to select the second network link controller,
  wherein the first radio request is not associated with a time-sensitive attribute, and the radio arbiter circuit is further configured to:
   based at least in part on a comparison between the first priority value and the second priority value, send a delayed request signal to the first network link controller, and
   upon completion of the second radio access request, set the control input to select the first network link controller.

17. The integrated circuit of claim 16 wherein the radio arbiter circuit is further configured to operate in:
 a static operating mode wherein the control input is set to a predetermined value, or
 a dynamic operating mode wherein the control input is determined upon receipt of a radio access request from either the first or the second network link controller.

18. The integrated circuit of claim 16 wherein the radio arbiter circuit is further configured to perform the following ordered steps:
 accept the first radio access request from the first network link controller to perform a first task, the request comprising the first priority value;
 determine the control input to grant control of the radio circuit by the first network link controller,
 accept the second radio access request from the second network link controller to perform a second task, the request comprising the second priority value greater than the first priority value; and
 determine the control input to grant control of the radio circuit by the second network link controller.

19. The integrated circuit of claim 18 wherein the radio arbiter circuit is further configured to:
 Increment the first priority value.

20. The integrated circuit of claim 16 further configured to:
 determine a first access request type from the first radio access request;
 determine a priority adjustment value based at least in part on the first access request type; and
 adjust the first priority value based at least in part on the priority adjustment value.

* * * * *